Dec. 27, 1927.  1,653,702

S. GUNDERSEN

STEEL WOOL HOLDER

Filed July 20, 1926

INVENTOR
S. Gundersen,
BY Hauff & Harland
ATTORNEYS

Patented Dec. 27, 1927.

1,653,702

UNITED STATES PATENT OFFICE.

SVEN GUNDERSEN, OF BROOKLYN, NEW YORK.

STEEL-WOOL HOLDER.

Application filed July 20, 1926. Serial No. 123,749.

My invention relates to a new and improved steel wool holder. As is well-known, steel wool is used for scouring purposes and particularly to the scouring of certain kitchen utensils and other articles.

The steel wool if used without some holding device, is injurious to the fingers. Furthermore a considerable amount of pressure and friction is required in order to scour and clean properly. I am aware that a number of attempts have been made to provide a holder which will accomplish this result. These prior devices, however, are complicated and expensive and fail to satisfactorily meet the requirements.

The object of the invention is to provide a simple and a cheap device for holding steel wool or other material to be used for scouring and cleaning purposes.

Another object of the invention is to provide a device by means of which the steel wool or scouring material may be quickly and readily attached to a holder, and when the scouring material is used up it can be thrown away and readily replaced.

The invention is more fully set forth in the following specification and drawing in which:—

Figure 1:
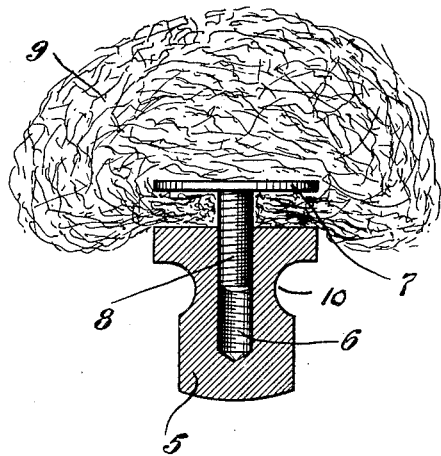
Fig. 1 shows a vertical, longitudinal section.
Figure 2:
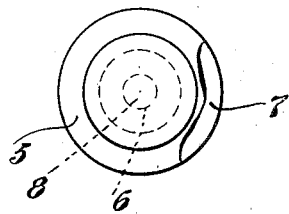
Fig. 2 is a plan view thereof.

In the drawing the numeral 5 represents a nut which serves as a holding device, and it also has an annular depression 10 to allow the fingers to secure a firm grip on the nut. The nut has a threaded socket 6. A plate or disk 7 provided with a threaded head or stem 8 coacts with the threaded socket 6.

It will be seen that the nut serves as a handle to grasp the device and at the same time as means for clamping a bunch of steel wool or other scouring material 9 between the disk and the nut. When the nut is turned it moves toward or from the disk compressing the wool between the screw and disk tightly, and also permits of loosening the scouring material so that it can be removed.

I claim:—

A scouring device comprising a nut having a threaded socket and a contiguous head to serve as a handle for grasping the device, and a disk with a threaded stem made to engage the socket, the scouring material being held between the underside of the nut and the under surface of the disk which has a smooth upper surface to support the material bunched about the disk.

In testimony whereof I have hereunto set my hand.

SVEN GUNDERSEN.